US010689019B2

(12) United States Patent
Myers

(10) Patent No.: US 10,689,019 B2
(45) Date of Patent: *Jun. 23, 2020

(54) LOAD MANEUVERING

(71) Applicant: Kevin Myers, LLC, Berkley, MI (US)

(72) Inventor: Kevin Myers, Berkely, MI (US)

(73) Assignee: KEVIN MYERS, LLC, Berkley, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/255,952

(22) Filed: Jan. 24, 2019

(65) Prior Publication Data

US 2019/0152504 A1    May 23, 2019

Related U.S. Application Data

(62) Division of application No. 15/059,509, filed on Mar. 3, 2016, now Pat. No. 10,227,079.

(60) Provisional application No. 62/128,096, filed on Mar. 4, 2015.

(51) Int. Cl.
*B62B 3/06* (2006.01)
*B66F 5/02* (2006.01)

(52) U.S. Cl.
CPC .......... *B62B 3/0606* (2013.01); *B62B 3/0625* (2013.01); *B66F 5/02* (2013.01); *B62B 2203/10* (2013.01)

(58) Field of Classification Search
CPC . B62B 3/0606; B62B 3/0625; B62B 2203/10; B66F 5/02
USPC .................... 211/182, 85.8; 280/35; 24/68 E
See application file for complete search history.

(56) References Cited

U.S. PATENT DOCUMENTS

| 530,437 | A | * | 12/1894 | Mason | B62B 5/0083 280/35 |
| 1,520,630 | A | * | 12/1924 | Bateman | B62B 5/0083 280/43.1 |
| 1,581,109 | A | | 4/1926 | Franke | |
| 2,359,016 | A | | 9/1944 | Wood | |
| 2,401,881 | A | * | 6/1946 | Petsche | B66C 19/02 157/1 |
| 2,450,690 | A | | 10/1948 | Robins | |
| 2,508,661 | A | * | 5/1950 | Campbell | B62B 3/0625 414/458 |

(Continued)

FOREIGN PATENT DOCUMENTS

| DE | 4209535 A1 | 1/1993 |
| DE | 4407170 A1 | 9/1995 |
| DE | 19508969 A1 | 10/1996 |

*Primary Examiner* — Stanton L Krycinski
(74) *Attorney, Agent, or Firm* — Reising Ethington P.C.

(57) ABSTRACT

A method to maneuver a load is disclosed, and includes providing a set of uprights, including spacing a set of front legs laterally apart from one another, to extend in a generally vertical direction, and spacing a set of rear legs laterally apart from one another and longitudinally from the set of front legs, to extend in a generally vertical direction. The method also includes coupling a set of front arms to the set of front legs in a generally vertically adjustable manner, coupling a set of rear arms to the set of rear legs in a generally vertically adjustable manner, providing a set of rollers to support the front and rear legs to facilitate rolling of the apparatus over the ground, suspending a load in a space between the arms, and adjustably moving the uprights in a direction toward one another to maneuver the load.

20 Claims, 3 Drawing Sheets

(56) References Cited

U.S. PATENT DOCUMENTS

| | | | |
|---|---|---|---|
| 2,551,097 A | 5/1951 | Cole | |
| 2,556,121 A | 6/1951 | Thomas | |
| 2,885,090 A | 5/1959 | Forman et al. | |
| 2,885,234 A | 5/1959 | Larson | |
| 3,486,650 A | 12/1969 | Boone | |
| 3,743,330 A | 7/1973 | Itatani | |
| 3,806,265 A | 4/1974 | Hattan | |
| 3,807,750 A | 4/1974 | Brown | |
| 3,881,689 A * | 5/1975 | Bury | B60P 3/32 254/45 |
| 3,997,945 A | 12/1976 | Robins | |
| 4,236,399 A | 12/1980 | Williams et al. | |
| 4,600,177 A | 7/1986 | Fritz | |
| 4,643,443 A | 2/1987 | Husa | |
| 4,861,218 A | 8/1989 | Lamer | |
| 4,984,814 A | 1/1991 | Graffunder | |
| 5,016,893 A | 5/1991 | Hart, Jr. | |
| 5,159,729 A | 11/1992 | Walker | |
| 5,304,370 A | 4/1994 | Hawkins et al. | |
| 5,660,518 A | 8/1997 | Meier | |
| 5,660,637 A | 8/1997 | Dodge | |
| 5,791,856 A | 8/1998 | Kosonen et al. | |
| 5,897,104 A | 4/1999 | Garbiso | |
| 5,947,307 A | 9/1999 | Battaglia et al. | |
| 6,173,947 B1 * | 1/2001 | Johnson | B05B 13/0285 269/17 |
| 6,234,432 B1 | 5/2001 | Piller et al. | |
| 6,250,529 B1 | 6/2001 | Babbitt et al. | |
| 6,386,515 B1 | 5/2002 | Sachtleben | |
| 6,959,918 B1 | 11/2005 | Samuels | |
| 8,066,267 B2 | 11/2011 | Schaerer | |
| 8,123,236 B1 | 2/2012 | Helenihi | |
| 8,328,029 B1 * | 12/2012 | Binsfeld | B66F 7/02 187/240 |
| 9,120,495 B1 * | 9/2015 | Anderson | B62B 3/04 |
| 2003/0184106 A1 | 10/2003 | Windecker | |
| 2008/0054580 A1 | 3/2008 | Glaser | |
| 2009/0035115 A1 | 2/2009 | Hammond | |
| 2009/0309079 A1 | 12/2009 | Lacina | |
| 2011/0036795 A1 | 2/2011 | Nimon | |
| 2011/0127477 A1 | 6/2011 | Kokolis | |
| 2012/0155997 A1 | 6/2012 | Pawlak | |
| 2013/0280020 A1 | 10/2013 | O'Brien et al. | |

* cited by examiner

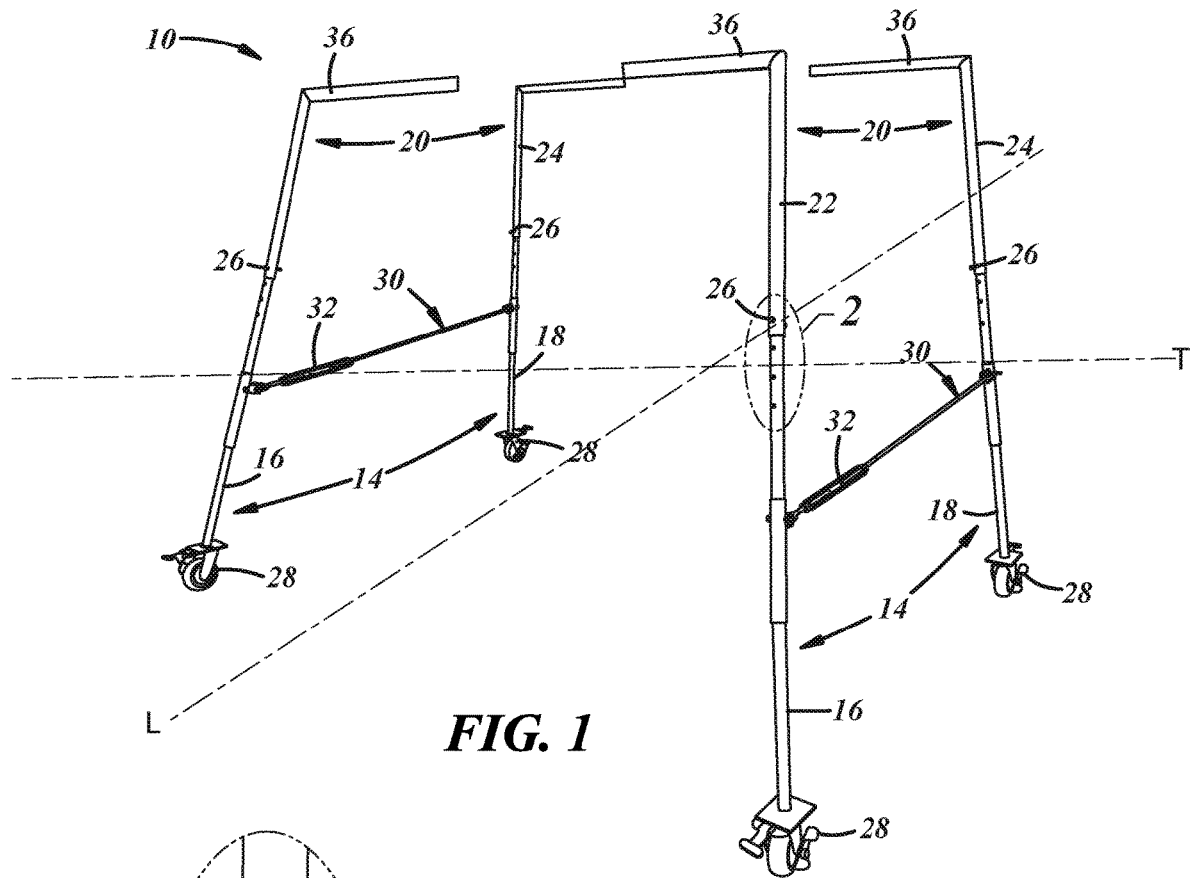
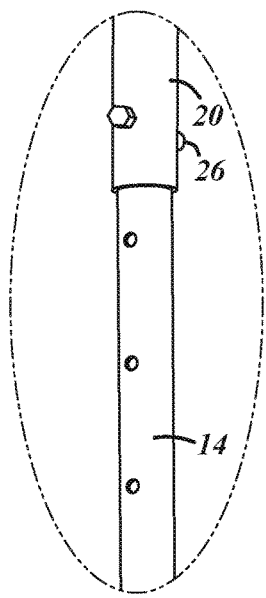
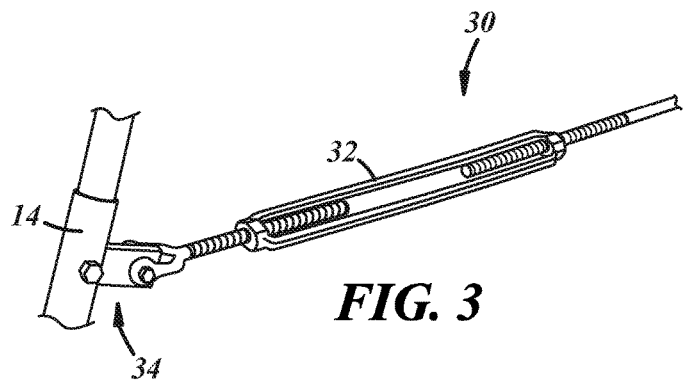
*FIG. 1*
*FIG. 2*
*FIG. 3*

LOAD MANEUVERING

TECHNICAL FIELD

This disclosure relates generally to hoist apparatuses and methods and, more particularly, to straddle-type hoists and related methods.

BACKGROUND

Users of vehicles such as off road vehicles are confronted with the task of manually removing or attaching a hard top as desired. A hard top is often large and heavy, and the manual removal or attachment of a hardtop is a task that requires more than one person.

However, it is not unusual that a user of a vehicle, such as an off road vehicle, is travelling alone. It follows that there are times when a user of a vehicle, such as an off road vehicle, may desire to remove or attach the hardtop of his or her vehicle at a time when he or she is travelling alone.

BRIEF SUMMARY

One illustrative embodiment of the present disclosure includes an apparatus to maneuver a load, including a set of uprights including a set of legs extending generally vertically upward and a set of arms extending from the legs in an adjustable manner, and a set of rollers supporting the legs to facilitate rolling of the apparatus over the ground, wherein the load is suspendible within a space between the arms, and the uprights are adjustably movable in a direction toward one another to maneuver the load.

Another illustrative embodiment of the present disclosure includes a method to maneuver a load. The method includes providing a set of uprights including spacing a set of front legs laterally apart from one another to extend in a generally vertical direction, and spacing a set of rear legs laterally apart from one another and longitudinally from the set of front legs to extend in a generally vertical direction. The method also includes coupling a set of front arms to the set of front legs in a generally vertically adjustable manner, and coupling a set of rear arms to the set of rear legs in a generally vertically adjustable manner. The method further includes providing a set of rollers to support the front and rear legs to facilitate rolling of the apparatus over the ground, suspending a load in a space between the arms, and adjustably moving the uprights in a direction toward one another to maneuver the load.

BRIEF DESCRIPTION OF THE DRAWINGS

Features and advantages of one or more of the disclosed embodiments of this disclosure will be apparent to those of ordinary skill in the art from the following detailed description of illustrative embodiments and the claims, with reference to the accompanying drawings in which:

FIG. 1 is a perspective view of an apparatus in accordance with an illustrative embodiment of the present disclosure;

FIG. 2 is an enlarged, fragmentary perspective view of the apparatus of FIG. 1, illustrating an arm coupled to a leg;

FIG. 3 is an enlarged, fragmentary perspective view of the apparatus of FIG. 1, illustrating an adjustable link coupled to a leg;

DETAILED DESCRIPTION

In general, an apparatus to maneuver a load will be described using one or more illustrative embodiments. The present disclosure provides an apparatus to allow a single individual to manually remove or attach, for example, a hard top from a vehicle. The example embodiments will be described with reference to their use in a vehicle environment. However, it will be appreciated as the description proceeds that the invention is useful in many different applications and may be implemented in many embodiments.

Figure 4:
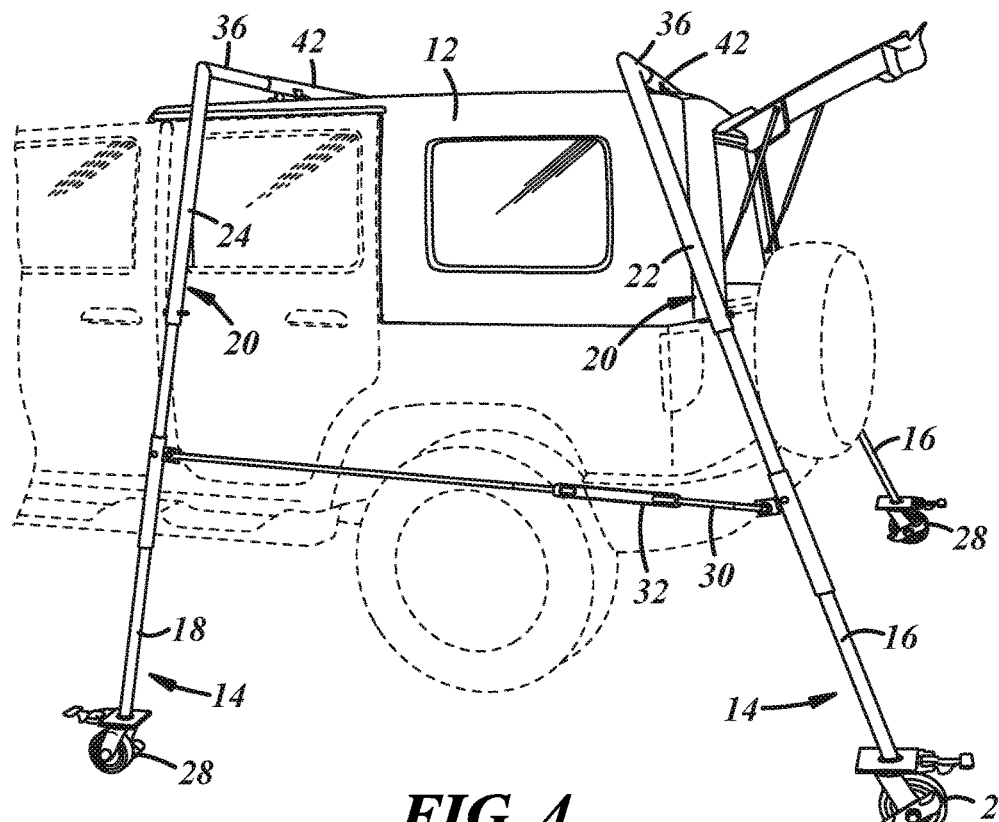
FIG. 4 is a perspective view of the apparatus of FIG. 1 in use with an off road vehicle.

Referring specifically to the drawings, FIGS. 1 and 4 perspectively depict an illustrative embodiment of an apparatus 10 for raising or lowering a load 12 (FIG. 4). The apparatus 10 includes a set of uprights, which may include a set of legs 14 extending generally vertically upward and a set of arms 20 extending from the legs 14, for example, in an adjustable manner. The apparatus 10 also includes a set of rollers 28 supporting the legs 14 to facilitate movement of the apparatus 10 over the ground. The load 12 is suspendable within a space between the arms 20, and the load 12 is raised or lowered by generally pulling together or releasing pairs of legs 14 within the set of legs 14. In one embodiment, the apparatus 10 may be a hoist for raising or lowering a hard top from a vehicle, wherein the apparatus 10 straddles a vehicle hard top.

Structurally, the set of legs 14 may include two or more legs 14 that are spaced apart to surround the load 12 on either side thereof and wherein the legs 14 extend generally vertically. For the purpose of this disclosure, the terminology "generally vertically" and "upright" may include orientation at an angle between 45 degrees and 90 degrees, inclusive, and including all ranges and subranges therebetween. For example, each upright of the set of uprights and each leg 14 may make an angle with the ground between 45 degrees and 90 degrees with respect to the ground and may be measured interior to the apparatus 10. Referring to the embodiment as depicted in FIG. 1, the set of legs 14 includes four legs at four corners of the apparatus 10, and the set of legs 14 includes a set of two front legs 16 spaced laterally apart from one another and a set of two rear legs 18 spaced laterally apart from one another and longitudinally from the set of front legs 16. The legs 14, as shown, may include telescoping, cylindrical tubes. In other embodiments the legs 14 may be bars, solid rods, non-cylindrical tubes, or any other structure that is capable of directly or indirectly supporting the arms 20 and the load 12, wherein the legs 14 may be made of metal, plastic, carbon fiber, or any other suitable material. It is also possible that each leg includes a leg assembly, composed of multiple parts coupled and/or telescoped together. FIG. 1 illustrates one possible leg assembly.

The set of arms 20 may include two or more arms 20 that extend from the legs 14 in an adjustable manner. In one embodiment, as depicted in FIG. 1, the set of arms 20 includes only four arms 20 coupled to four legs 14, wherein the legs 14 are at four corners of the apparatus 10. Further, the arms 20 may extend generally vertically with the legs 14. The set of arms 20 may include, as shown in FIG. 1, a set of two front arms 22 spaced laterally apart from one another, and a set of two rear arms 24 spaced laterally apart from one another and longitudinally from the set of front arms 22. The arms 20, as shown in illustrative embodiments, may include telescoping, cylindrical tubes. In other embodiments the arms 20 may be bars, solid rods, non-cylindrical tubes, or any other structure that is capable of coupling to the legs 14 and directly or indirectly supporting the load 12, wherein the arms 20 may be made of metal, plastic, carbon fiber, or any other suitable material. It is also possible that each arm 20 include an arm assembly composed of multiple parts coupled and/or telescoped together.

The arms 20 may be coupled to the legs 14 by locking members 22. In one embodiment, the arms 20 are telescoped with respect to the legs 14 and detachedly secured by locking members 22, as depicted in FIG. 2. The locking members 22 may be lock pins, screws, nails, bolts, or any other device(s) capable of coupling the arms 20 with the legs 14. To accommodate different load heights, the arm 20 is adjustable in length and may slide into or out of the leg member 14 to which it is coupled before being secured by the locking member 22. Referring to FIG. 2, this can be done using telescoping tubes whereby a tube of the leg 14 and a tube of the arm 20 are secured at the desired height with the locking member 22.

The set of rollers 28 may include two or more rollers 28 coupled to and supporting the legs 14 to facilitate movement of the apparatus 10 over the ground. In one embodiment as depicted in FIG. 1, the set of rollers 28 includes four rollers 28 coupled to the four legs 14 at the end of the leg 14 disposed nearest the ground or floor. The rollers 28 may be made of caster wheels or any other rollable device capable of being mounted to the legs 14 and of easily moving the apparatus 10.

The apparatus 10 also may include a set of adjustable links 30 extending between at least two uprights of the set of uprights, for example, between at least two legs 14 of the set of legs 14 for the purpose of drawing the uprights, for example, the legs 14, along each side of the apparatus 10 in a direction toward one another. In the illustrative embodiment of FIG. 3, the apparatus 10 includes adjustable links 30 extending between each rear leg 18 and corresponding front leg 16. In one embodiment as depicted in FIG. 1, the set of adjustable links 30 includes two links, spaced laterally apart from one another on either side of a longitudinal axis L, and coupled to and extending between each front leg 16 and corresponding rear leg 18. The adjustable links 30 may include turnbuckles, as depicted in FIG. 3, spreader bars, ratcheted straps, or any other device(s) capable of easily extending or compressing the distance between the two legs 14 to which the adjustable link 30 is connected. The adjustable link 30 may attach to the legs 14 by a coupler 34, for example, a weldment, lock pin, screw, nail, bolt, an/or other suitable coupling.

The apparatus 10 also may feature a set of supports, end-effectors, or couplings 36 extending from, continuous with, or coupled to the arms 20. The couplings 36 may be spaced longitudinally apart from one another on either side of a transverse axis T. The couplings 36 may include, shafts, tubes, bars, or any other structure suitable to directly or indirectly support the load 12. In one embodiment, the couplings 36 extend in a direction toward the load 12. To accommodate different load widths, the couplings 36 may be adjustable in length.

Figure 5:
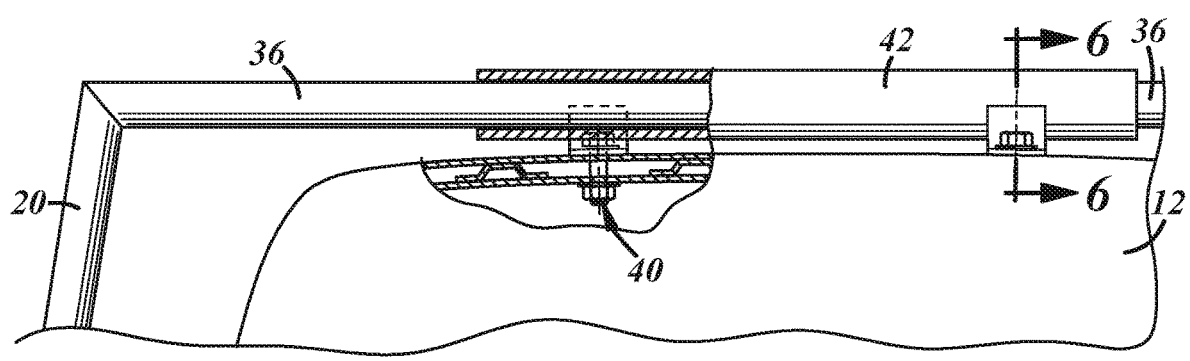
FIG. 5 is an enlarged, fragmentary, sectional view of a portion of the apparatus of FIG. 4, and illustrating a coupling of the apparatus coupled to a mount of the off road vehicle.

In the illustrative embodiment of FIG. 5, the couplings 36 may include solid or hollow shafts that may be fixed to the arms 20, for example, via welding, fastening, press-fit, or the like. In another embodiment, the couplings 36 may be telescoped to the arms 20 in a generally horizontally adjustable manner, for example, in a direction parallel to the transverse axis T. Further depicted in FIG. 4, the couplings 36 extend from the four arms 20 in the four corners of the apparatus 10, in a direction toward the load 12, wherein the couplings 36 between the front arms 22 may be disposed longitudinally parallel to the couplings 36 between the rear arms 24.

Figure 6:
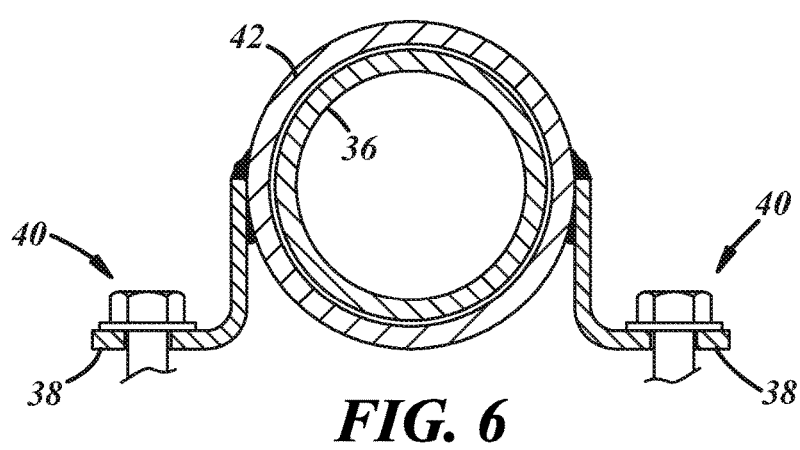
FIG. 6 is an enlarged, fragmentary, sectional view of a portion of the apparatus of FIG. 4, taken along line 6-6 of FIG. 5, and illustrating the coupling coupled to the mount of the off road vehicle.

The couplings 36 may be directly or indirectly coupled to the load 12 using any arrangement suitable to suspend the load 12. In the embodiment of FIG. 1, the couplings 36 are adjustably coupled to a set of load mounts 42, wherein the set of load mounts 42 are spaced longitudinally apart from one another between the two front 22 and two rear arms 24. The set of couplings 36 may be telescoped with respect to the set of load mounts 42, as in FIG. 4, or otherwise coupled to the load mounts 42 in a manner that allows the length of the coupling 36 to vary in order to accommodate loads of varying widths. In one embodiment, the load mounts 42 may be coupled to brackets 38, by welding or other permanent or non-permanent securing means, and the brackets 38 may be coupled to the top of the load 12 using a set of fasteners 40, which may include rivets, or nuts and bolts as shown in FIGS. 5 and 6, or any other suitable fasteners. In other embodiments, the couplings 36 may comprise suction cups to suction to the top of the load 12 to hold it, or hooks capable of hooking to complementary portions of the load 12 to suspend the load 12, or any other device(s) suitable to couple the couplings 36 to the load 12.

In assembly, a user may retrieve the apparatus 10 from storage, such as the rear of a vehicle. If the leg 14 is a leg assembly, the user may connect the leg portions together. Where the leg 14 is a leg assembly, the leg assembly may be connected in a telescoping manner and be secured with the locking member 26, for example, one or more lock pins, screws, bolts, or any other suitable coupling(s). In other embodiments, the leg assembly pieces may twist or otherwise fit together, and the locking member 26 may be unnecessary.

The legs 14, when assembled, will be positioned off the ground in a slightly angled position, wherein the angle formed between the ground and each leg may be generally less than 90 degrees, measured interior to the apparatus 10. In one embodiment, as shown in FIG. 4, the angle is between 45 degrees and 75 degrees. To lower the load 12, the legs 14 initially may be positioned at a nearly upright position, wherein the angle formed between the ground and each leg may be approximately 90 degrees, measured interior to the apparatus 10. In one embodiment, the angle is between 70 and 90 degrees.

At the end of the legs 14, closest to the ground or floor, the user may attach the rollers 28. In another embodiment, the legs 14 may be fixed to the rollers 28 without requiring assembly.

At the other end of the legs 14 opposite the ground or floor, the user may couple the set of arms 20 to the set of legs 14. As in FIG. 2, the user may connect the arms 20 to the legs 14 in a telescoping manner and secure them with the locking member 26, such as lock pins, screws, or bolts. In other embodiments, the arm 20 may twist or otherwise fit together with the leg 14, and the locking member 26 may be unnecessary. In another embodiment, the user may couple the arms 20 directly to the load 12 using any appropriate combination of tubes, bars, brackets, nails, screws, lock pins, nuts, bolts, suction devices, hooks, and/or any other device(s) capable of coupling the arms 20 to the load 12.

A user also may couple the set of adjustable links 30 to the legs 14 using any appropriate locking coupler 34, such as lock pins, screws, or bolts. In accordance with the illustrated embodiments, a user may also couple the adjusting device 32 to the rest of the adjustable link 30.

A user may couple the arms 20 to a set of couplings 36. Referring to FIG. 1, the couplings 36 are couplings extending continuously from the arms 20 in a telescoping manner. In other embodiments, the arms 20 may twist or otherwise fit together with the couplings 36, or may be welded to the couplings 36, or may extend integrally therefrom, such that a fastening device is unnecessary.

Referring to FIG. 5, a user may couple the couplings 36 to the load mounts 42 in a telescoping manner. In other embodiments, the couplings 36 may couple to the load 12 without the use of the load mounts 42. In such embodiments, the user may secure the couplings 36 to the load 12 using any appropriate combination of tubes, bars, brackets, nails, screws, lock pins, nuts, bolts, suction cups, hooks, and/or any other device capable of coupling the apparatus 10 to the load 12.

It will be appreciated by those skilled in the art that the order of the assembly may be varied. Moreover, to disassemble the apparatus 10, those skilled in the art will recognize that, after the load 12 is detached, the components previously assembled may be disassembled in a similar, yet reverse, fashion.

Figure 7:
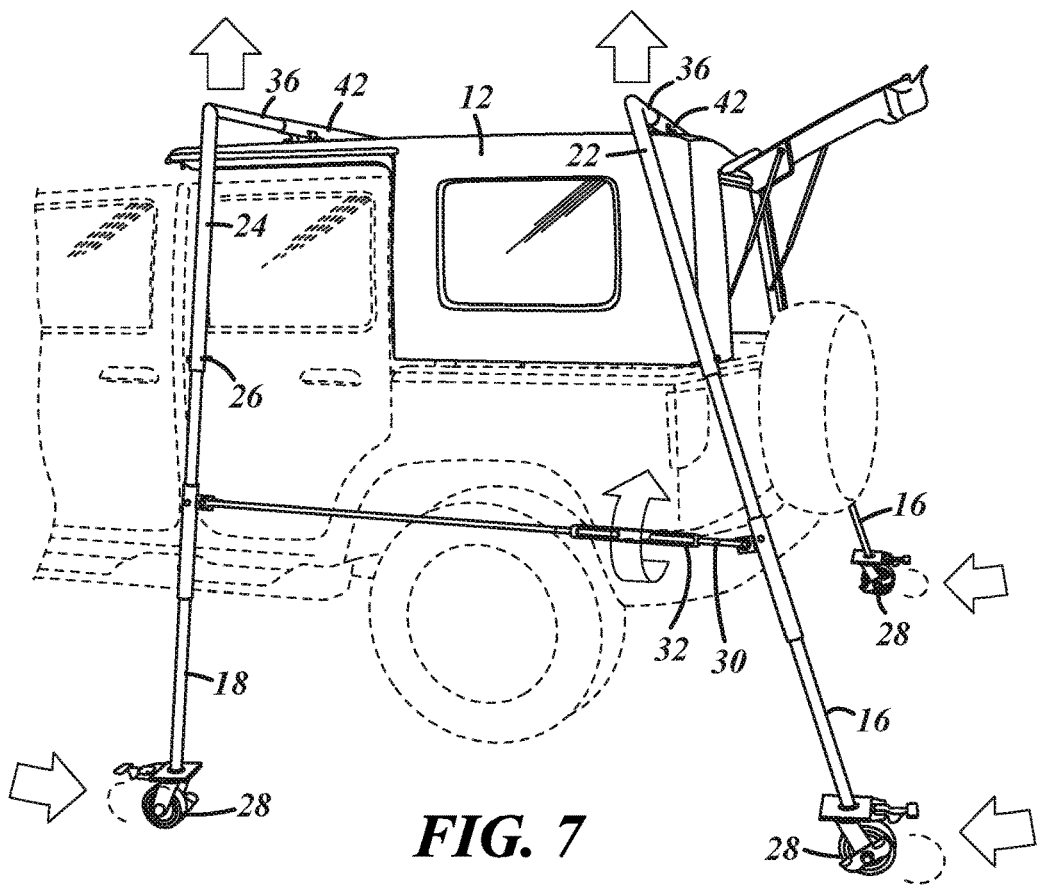
FIG. 7 is similar to FIG. 4, and illustrates directions of movement of various portions of the apparatus when removing a load.

In operation, and with reference to FIG. 4, to raise the load 12, a user may roll or otherwise move the apparatus 10 to a position that straddles the load 12. The load 12 may be coupled to the apparatus 10 directly or indirectly via the couplings 36. Referring to FIG. 5, the couplings 36 may connect to the load mounts 42. With reference to FIG. 7, to raise the load 12, the set of legs 14 includes two front legs 16 and two rear legs 18, and the load 12 is suspended within a space laterally between the arms 20. In other embodiments, dependent on the size of the load 12, the load 12 may be suspended within a space laterally between both the arms 20 and the legs 14. In one embodiment, the arm length may be adjusted to accommodate the height of the load 12, and the coupling or coupling length may be adjusted to accommodate the width of the load 12. In the illustrated embodiments, the arms 20 and couplings 36 are pulled out of or pushed into each other as telescoping tubes, and the locking members 22 are inserted to sustain the tubes at the desired length. In the embodiment of FIG. 7, the couplings 36 may be inserted into the mounts 42 on the load 12, and the user may turn the turnbuckle 32.

As the turnbuckle is turned, the legs 14 coupled to the adjustable links 30 are drawn toward one another. The set of adjustable links 30 aids in adjusting the legs 14 between angled and substantially upright positions. In FIG. 7, each front leg 16 is pulled toward its corresponding rear leg 18. In other embodiments, a user may similarly operate the adjustable link 30 in such a way that draws the legs 14 together to maneuver (e.g., raise or lower) a load 12. As the adjustable link 30 is tightened, the angle formed between the ground and each leg 14, measured interior to the apparatus 10, will approach 90 degrees. As the angles increase through toward 90 degrees, the load 12 is raised off of the vehicle.

Figure 8:
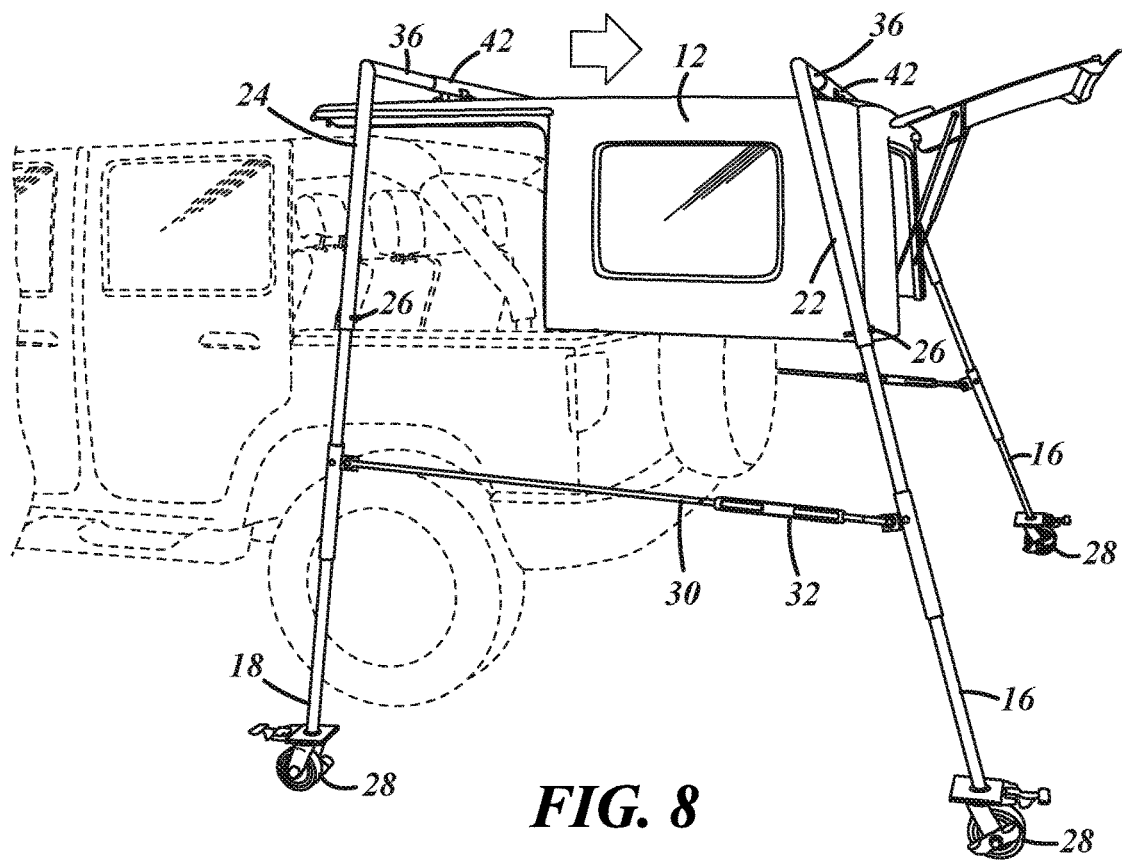
FIG. 8 is similar to FIGS. 4 and 7, and illustrates the direction of movement of the apparatus once the load has been detached from the off road vehicle.

The apparatus 10 can then be rolled away as depicted in FIG. 8, and the load 12 removed and unloaded 12 from the apparatus 10.

To lower the load 12 off of the apparatus 10, a user performs substantially the opposite steps as required to raise the load 12. A user may roll or otherwise move the apparatus 10 to a position that straddles the location to which the load 12 is to be unloaded. The user may operate the adjustable link 30 in a manner to draw apart the legs 14 coupled to each adjustable link 30. As the adjustable link 30 is loosened, the angle may generally diminish from between 70 and 90 degrees to between 45 and 75 degrees, for example. As the angle decreases, the load 12 is lowered to sit on the vehicle or other destination. The load 12 can then be unloaded, and the apparatus 10 rolled away, disassembled, and placed in the vehicle.

Finally, the foregoing description is not a definition of the invention, but is a description of one or more examples of illustrative embodiments of the invention. The statements contained in the foregoing description relate to the particular examples and are not to be construed as limitations on the scope of the invention as claimed below or on the definition of terminology used in the claims, except where terminology is expressly defined above. And although the present invention has been disclosed using a limited number of examples, many other examples are possible and it is not intended herein to mention all of the possible manifestations of the invention. In fact, other modifications, variations, forms, ramifications, substitutions, and/or equivalents will become apparent to those skilled in the art in view of the foregoing description. The present invention is intended to embrace such forms, ramifications, modifications, variations, substitutions, and/or equivalents as fall within the spirit and broad scope of the following claims. In other words, the present invention encompasses many substitutions or equivalents of limitations recited in the following claims. For example, the materials, sizes, and shapes, described above could be readily modified or substituted with other similar materials, sizes, shapes, and/or the like. Therefore, the invention is not limited to the particular examples of illustrative embodiments disclosed herein, but instead is defined solely by the claims below.

The invention claimed is:

1. A method to maneuver a load with an apparatus, the method comprising:
   providing a set of uprights, including:
      spacing a set of front legs laterally apart from one another, to extend in a generally vertical direction, and
      spacing a set of rear legs laterally apart from one another and longitudinally from the set of front legs, to extend in a generally vertical direction;
   coupling a set of front arms to the set of front legs in a generally vertically adjustable manner;
   coupling a set of rear arms to the set of rear legs in a generally vertically adjustable manner;
   providing a set of rollers to support the front and rear legs to facilitate rolling of the apparatus over the ground;
   suspending a load in a space between the front arms and the rear arms;
   coupling adjustable links between the front legs and the rear legs;
   adjustably moving the uprights in a direction toward one another to raise the load and in a direction away from one another to lower the load, using the adjustable links.

2. The method of claim 1, further comprising coupling a set of couplings to the front arms and the rear arms in a transverse direction toward the load.

3. The method of claim 2, wherein the couplings include tubes.

4. The method of claim 1, wherein the adjustable links include turnbuckles, and wherein the adjustably moving step includes turning the turnbuckles extending between and pivotably coupled to the front legs and the rear legs to move the front legs and the rear legs toward one another to raise the load and away from one another to lower the load.

5. The method of claim 1, wherein the set of rollers includes a caster wheel coupled to each of the front and rear legs, and wherein the front legs and the rear legs include leg assemblies.

6. The method of claim 1, wherein the front legs and the rear legs include tubes, and the front arms and the rear arms include tubes.

7. A mobile hoist for removing a load from a vehicle, and comprising:
  a set of front legs spaced laterally apart from one another, and extending in a generally vertical direction;
  a set of rear legs spaced laterally apart from one another and longitudinally from the set of front legs, and extending in a generally vertical direction;
  adjustable links spaced laterally apart from one another, and coupled to and extending between the front legs and the rear legs;
  a set of front arms spaced laterally apart from one another, and coupled to the set of front legs in a generally vertically adjustable manner;
  a set of rear arms spaced laterally apart from one another and longitudinally from the set of front arms, and coupled to the set of rear legs in a generally vertically adjustable manner; and
  a set of rollers supporting the front and rear legs to facilitate rolling of the hoist over the ground,
  wherein a load is suspendible by the hoist in a space between the front arms and the rear arms, and the adjustable links are adjustable such that the front legs and the rear legs are adjustably movable in a direction toward one another to raise the load and in a direction away from one another to lower the load.

8. The hoist of claim 7, wherein the rollers include caster wheels, the front legs and the rear legs include tubes, the front arms and the rear arms include tubes telescoped with respect to the front legs and the rear legs, and the adjustable links include turnbuckles turnable to move the front legs and the rear legs toward one another to raise the load and away from one another to lower the load.

9. The hoist of claim 7, further comprising
  a set of couplings carried by the front arms and the rear arms, extending transversely toward the load, and configured to be coupled to the load.

10. The hoist of claim 9, wherein the set of end couplings adjustably couples to a set of load mounts coupled to the load, wherein the set of load mounts is spaced longitudinally apart from one another, and the set of end couplings is telescoped with respect to the set of load mounts.

11. The hoist of claim 7, wherein the hoist is a self-supporting, traversable, height adjustable, straddle-style apparatus.

12. The hoist of claim 7, wherein the front arms and the rear arms are detachedly connected to the legs by removable lock members.

13. The hoist of claim 7, wherein the hoist is used for removing or attaching a hard top from a vehicle, the set of front legs includes two front leg assemblies and the set of rear legs includes two rear leg assemblies, the set of front arms includes two front arms telescoped to the set of front legs and the set of rear arms includes two rear arms telescoped to the set of rear legs, and the set of rollers include four caster wheels.

14. The hoist of claim 7, wherein the adjustable links are coupled to the front legs and the rear legs with locking couplers that include lock pins, screws, nails, or bolts.

15. The hoist of claim 7, wherein the adjustable links are pivotably coupled to the front legs and to the rear legs.

16. The method of claim 1, further comprising coupling the adjustable links to the front legs and the rear legs with locking couplers that include lock pins, screws, nails, or bolts.

17. The method of claim 1, further comprising pivotably coupling the adjustable links to the front legs and to the rear legs.

18. The method of claim 1, wherein the load is a vehicle hard top and the apparatus is a hoist used for removing the hard top from the vehicle.

19. The method of claim 1, wherein the adjustable links include turnbuckles having threaded portions threadably coupled to corresponding threaded portions of other elements of the adjustable links, and wherein the adjustably moving step includes compressing the distance between the front and rear legs to raise the load and extending the distance between the front and rear legs to lower the load.

20. The hoist of claim 7, wherein the adjustable links include turnbuckles having threaded portions threadably coupled to corresponding threaded portions of other elements of the adjustable links, and wherein the turnbuckles are turnable to compress the distance between the front and rear legs to raise the load and extend the distance between the front and rear legs to lower the load.

* * * * *